March 17, 1925.
A. C. BROWN
1,530,104
COMBINATION FAUCET
Filed Jan. 7, 1924
2 Sheets-Sheet 1
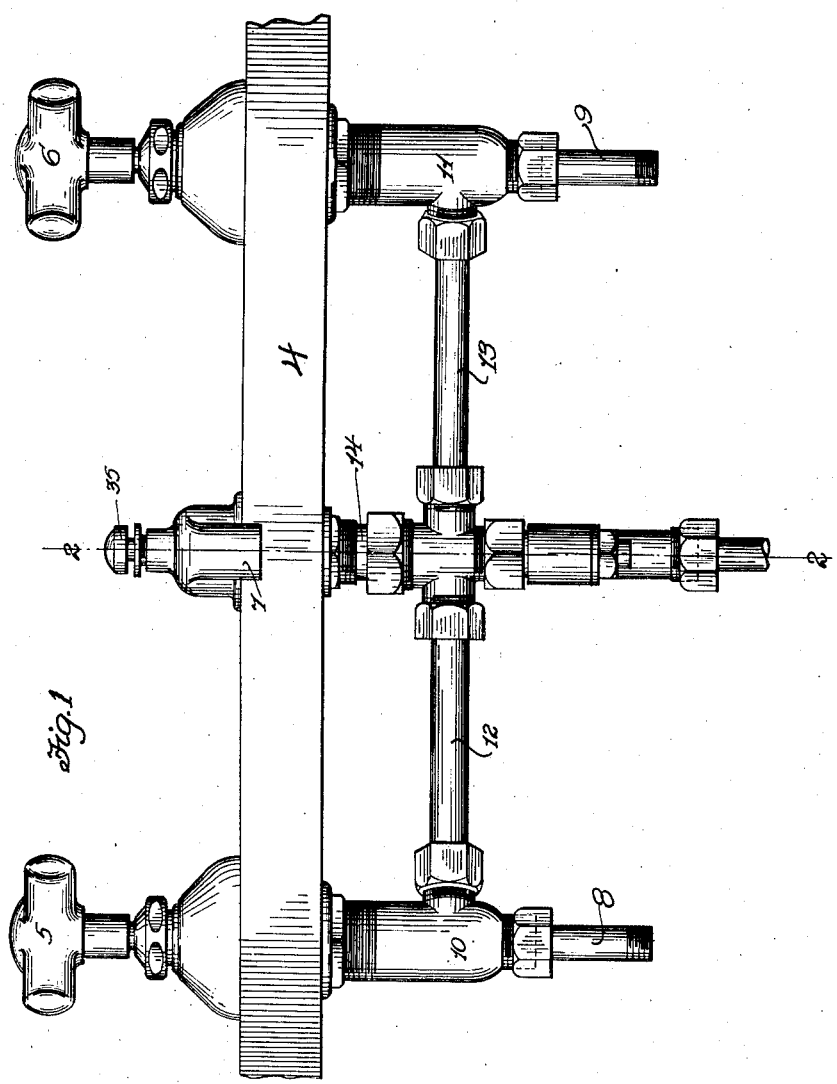

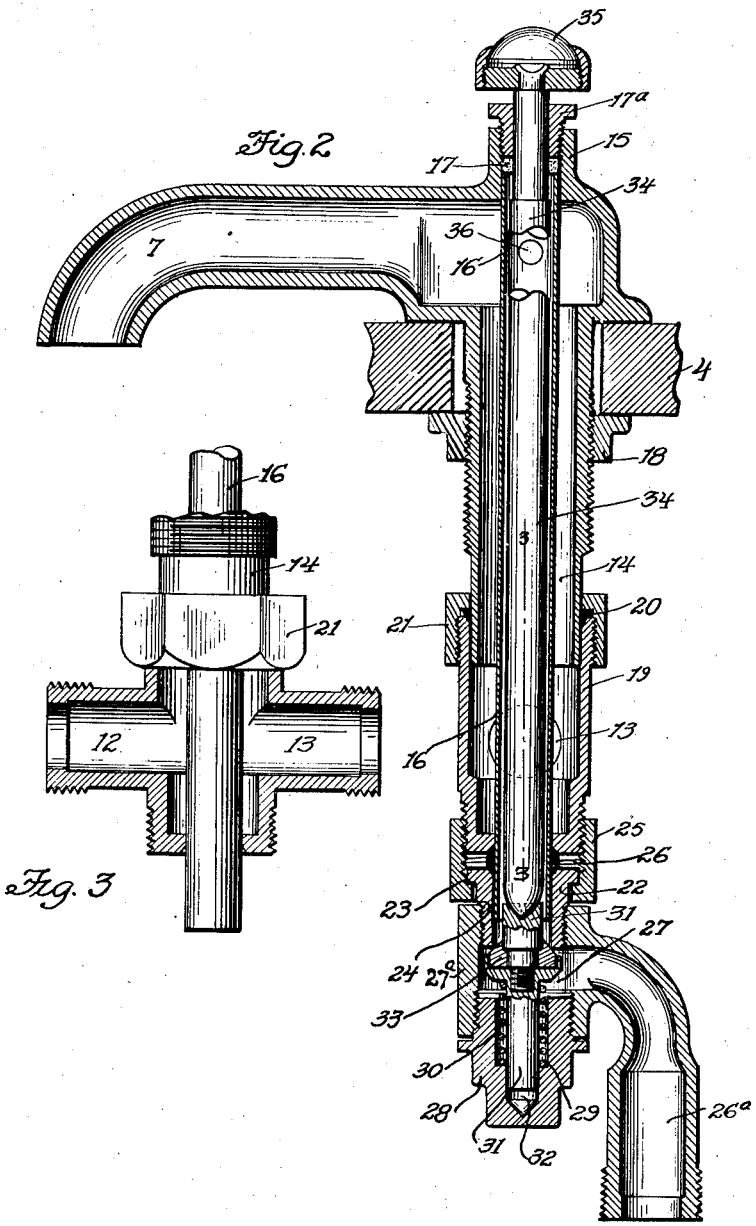

Patented Mar. 17, 1925.

1,530,104

UNITED STATES PATENT OFFICE.

ALBERT C. BROWN, OF CHICAGO, ILLINOIS.

COMBINATION FAUCET.

Application filed January 7, 1924. Serial No. 684,794.

*To all whom it may concern:*

Be it known that I, ALBERT C. BROWN, a citizen of the United States, residing in Chicago, Cook County, State of Illinois, have invented certain new and useful Improvements in Combination Faucets, of which the following, taken in connection with the drawings, is a description.

My invention relates to combination faucets, of the class ordinarily used in lavatories where it is desirable to economize on space and the number of parts forming the fixture, and in this instance, I have provided a fixture having a common mixing chamber for hot and cold water with provision for discharging from the same discharge spout either hot or cold water, or to open both faucets and secure the temperature required by a mixture of both hot and cold water before discharging from the discharge spout.

It is also an object of my invention to provide mechanism whereby a pipe connection having communication with a source of ice water will also discharge through the same spout or nozzle, thereby combining within one structure, the discharge connection for warm water, hot water, cold water and ice water.

An additional object of the present invention is to produce a unitary structure which will serve the purpose intended, at the same time occupy less space and is more convenient for use than structures heretofore made for this purpose.

With the foregoing and other objects in view, my invention resides in the novel features of construction and the combination and arrangement of parts hereinafter described and claimed.

In the accompanying drawings I have illustrated what I now consider the preferred form of an embodiment of the essential features of my invention and in these drawings—

Figure 1 is a front elevation of my invention,

Figure 2 is a vertical sectional view taken on line 2—2 of Figure 1, and—

Figure 3 is a sectional detail taken on line 3—3 of Fig. 2.

Referring to the drawings, 4 represents the ordinary slab or lavatory top through which my fixture is attached as shown, and valve 5 is provided to control the hot water supply, and a valve 6 is provided to control the cold water supply to the discharge pipe or nozzle 7. The supply pipes 8 and 9 have suitable connections to the hot and cold water mains not here shown. Coupled to each supply pipe 8 and 9 is a T-coupling 10 and 11, from each of which extends a pipe 12 and 13 leading to a common mixing chamber 14 having connection with the nozzle or discharge pipe 7.

Referring more particularly to Figure 2, the nozzle 7 is provided with an annular opening through the top thereof, which extends through a nipple 15 which is intermittently threaded. A tubular stem or casing 16 fits into this opening formed in the nipple 15 which extends through the mixing chamber 14 to a point below the intake openings 12 and 13.

A gasket or packing 17 rests upon the upper end of the tubular casing 16, which is held in place by a screw cap 17ª which engages the thread upon the nipple 15.

The mixing chamber 14 is provided with screw threads upon the exterior thereof, for a portion of its length, whereby a nut 18 secures the device to the slab, 4.

Surrounding the lower end of the wall of the mixing chamber 14 is a sleeve 19, which has a washer 20, which, with the threaded cap 21, provides a tight closure between said sleeve 19 and the wall of the mixing chamber 14.

The lower end of the sleeve 19 is threaded exteriorly and at the lower end thereof has a smaller diameter than at the upper end, the annular opening through the lower end surrounding the tubular casing 16, which extends beneath it.

22 is a threaded nipple which is provided with the exterior shoulders 23 and 24, which are of different sizes. Surrounding said nipple and abutting against the larger shoulder 23 is a screw cap 25, by means of which said nipple 22 is secured to the casing 16, and a complete closure is effected by the washer 26. A supply pipe 26ª extends into a chamber 27 formed in the valve casing 27ª which casing is interiorly threaded and has engagement at the upper end thereof with threaded nipple 22. The lower end of said valve chamber 27 is closed by a suitable threaded fitting 28, which has an annular opening therein, provided with an inner circumferential shoulder 29 forming a seat for the compression spring 30, which surrounds the valve rod 31, movable in the opening 32.

Positioned within the chamber 27 is the valve 33, normally seated in the opening in the threaded nipple 22 and held in position by the spring 30.

Extending through the tubular casing 16 and through the niple 17ª is a plunger 34 which has connection at the lower end thereof with the valve rod 31. Pressure upon the knob 35 attached to the top of the plunger 34 unseats the valve 33 leaving an open passageway from the pipe 26 to the valve casing 27 into the tubular casing 16. Near the upper end of the tubular casing 16, is an opening 36 from which ice water is discharged through the upper part of the mixing chamber 14 and out through the nozzle or discharge opening 7. When pressure upon the plunger 34 is released, the tension of the spring 30 will automatically force the valve 33 to its seat and close the opening from the supply pipe 26.

It will be observed that in the operation of this combination faucet, the user may obtain hot water by opening the valve 5 or cold water by opening the valve 6 or warm water by opening both valves and allowing hot and cold water to enter the mixing chamber at the same time and discharge through the nozzle 7. If ice water is desired, both valves 5 and 6 remain closed and pressure is applied to the plunger 35ª to open the valve 33 and permit ice water to be supplied through pipe 26, which will discharge through the opening 36 into the tubular casing 16 into the discharge nozzle 7; the pipe or casing 16 carrying ice water is at no time affected by the discharge of either hot or cold water into the mixing chamber 14 surrounding it, and its operation is entirely independent from the valves controlling the suply of hot and cold water.

I claim:

1. A lavatory fixture comprising a casing forming a mixing chamber, discharge nozzle extending therefrom, a pipe extending through said mixing chamber, a valve at the lower end of said pipe, said pipe having an opening near the top thereof on a plane with the discharge nozzle, said pipe having connection with a source of water supply independent of any pipe discharging into said mixing chamber.

2. A lavatory fixture comprising a casing forming a mixing chamber, discharge nozzle extending therefrom, a pipe extending through said mixing chamber, a valve at the lower end of said pipe, said pipe having an opening into the mixing chamber, said pipe having connection with a source of water supply independent of the hot and cold water supply pipes.

3. A lavatory fixture comprising a discharge pipe communicating with the mixing chamber, a water pipe opening into the aforesaid mixing chamber, valves controlling the supply of water through said pipes, a valve controlled pipe extending through said mixing chamber and having an opening into the mixing chamber, said last named pipe having connection with an independent source of water suply.

4. A lavatory fixture comprising a discharge pipe having communication with a mixing chamber, a water supply pipe in said mixing chamber at right angles thereto, a tubular member extending through the mixing chamber and having an opening at the upper end thereof on a plane with the discharge nozzle, said tubular member having connection with an independent source of water supply, a valve controlling the supply of water through said tubular member, means for opening said valve, and means for automatically closing the same.

5. In a lavatory fixture, the combination of a casing forming a mixing chamber having a discharge nozzle extending therefrom, a valve controlled supply pipe communicating with said chamber, a pipe extending through said mixing chamber and communicating directly with the discharge nozzle, a valve in said pipe, a valve rod movable within said pipe to open said valve and control the inflow of water from an independent source of supply.

6. In a lavatory fixture, the combination of a casing forming a mixing chamber, a discharge nozzle extending therefrom, valve controlled supply pipes communicating with said chamber, a valve casing secured to the lower end of the mixing chamber, a pipe extending from said valve casing through the mixing chamber and having a discharge opening on a plane with the discharge nozzle, a valve controlled mechanism permitting an independent flow of water through said valve casing to the discharge nozzle.

7. In a lavatory fixture, the combination of a casing forming a mixing chamber, a discharge nozzle extending therefrom, a valve controlled supply pipe entering said chamber, a valve casing having a chamber therein which has connection with an independent source of water supply, a valve in said casing, a pipe extending from said casing through the aforesaid mixing chamber and having a discharge opening into the aforesaid nozzle, a valve rod extending through said pipe whereby said valve may be opened to permit the passage of water through the valve chamber and pipe to the discharge nozzle.

8. In a lavatory fixture, the combination of a casing forming a mixing chamber having a discharge nozzle extending therefrom, a valve controlled water supply pipe entering said chamber adjacent to the lower end thereof, a pipe extending vertically through said mixing chamber and having an opening at the upper end thereof on a plane with the discharge nozzle, said pipe extending through the lower end of the mixing chamber, a valve casing below the mixing chamber, a valve therein, a supply pipe opening into said valve casing, and means for operating said valve to permit an independent flow of water through the last named supply pipe to the discharge nozzle independent of the first mentioned supply pipe.

9. In a lavatory fixture, the combination of a casing forming a mixing chamber, a discharge nozzle from the upper part of said mixing chamber, a valve controlled water supply pipe entering said mixing chamber, a valve casing secured to the lower end of said mixing chamber, a pipe extending through said mixing chamber into the valve casing, a valve seating in said casing, a valve rod extending through the aforesaid pipe and through the opening at the top of the mixing chamber for opening said valve, and means automatically closing said valve when pressure upon the aforesaid rod is released.

10. In a lavatory fixture, the combination of a casing forming a mixing chamber, a discharge nozzle extending therefrom, a valve controlled water supply pipe entering said mixing chamber, a valve casing in operative relation with said mixing chamber, a valve in said casing, a supply pipe opening into said casing, a pipe extending from the valve casing through the mixing chamber and having an opening near the upper end thereof in line with the discharge nozzle, a pressure rod for opening said valve, and a spring in operative relation therewith for automatically closing the same.

11. A lavatory fixture comprising a discharge nozzle, hot and cold water pipes communicating with said nozzle, valves for controlling the flow through said pipes, a third pipe communicating with said nozzle, a valve for controlling the flow through said third pipe and a push rod longitudinally movable through said third pipe for operating said last mentioned valve.

12. A lavatory fixture comprising a discharge nozzle, a conduit communicating with said nozzle, a tube extending through said conduit, a pipe communicating with said conduit, a valve for controlling the flow through said pipe, a pipe communicating with said tube, a valve for controlling the flow through said tube and a push rod displaceable longitudinally of said tube for opening said last mentioned valve, said tube being provided with an opening communicating directly with said discharge nozzle.

In testimony whereof I have signed this specification.

ALBERT C. BROWN.